US008527184B2

(12) United States Patent
Pontoppidan et al.

(10) Patent No.: US 8,527,184 B2
(45) Date of Patent: Sep. 3, 2013

(54) SBS LOGICAL BIO-DIESEL SENSOR

(75) Inventors: Michael Pontoppidan, Colombes (FR); Gino Montanari, Santana do Parnaiba/SP (BR)

(73) Assignee: Magneti Marelli Sistemas Automotivos Industria e Comercio Ltda., Hortolandia/SP (BR)

( * ) Notice: Subject to any disclaimer, the term of this patent is extended or adjusted under 35 U.S.C. 154(b) by 616 days.

(21) Appl. No.: 12/723,195

(22) Filed: Mar. 12, 2010

(65) Prior Publication Data

US 2010/0235073 A1 Sep. 16, 2010

(30) Foreign Application Priority Data

Mar. 13, 2009 (BR) ...................................... 0900653

(51) Int. Cl.
*F02D 41/00* (2006.01)
(52) U.S. Cl.
USPC .......................................... 701/106; 123/575
(58) Field of Classification Search
USPC .......... 123/1 A, 27 A, 27 R, 27 GE, 525–527, 123/575–577; 701/102–104, 106, 115
See application file for complete search history.

(56) References Cited

U.S. PATENT DOCUMENTS

| 4,402,296 | A | * | 9/1983 | Schwarz | 123/575 |
|---|---|---|---|---|---|
| 5,336,396 | A | * | 8/1994 | Shetley | 210/90 |
| 5,386,804 | A | * | 2/1995 | Guttmann et al. | 123/1 A |
| 6,003,303 | A | * | 12/1999 | Peter-Hoblyn et al. | 60/274 |
| 7,401,591 | B2 | * | 7/2008 | Yamaguchi et al. | 123/299 |
| 7,797,097 | B2 | * | 9/2010 | Kawamura et al. | 701/103 |
| 8,060,292 | B2 | * | 11/2011 | Takahashi et al. | 701/104 |
| 8,141,356 | B2 | * | 3/2012 | Leone et al. | 60/601 |
| 2004/0261414 | A1 | * | 12/2004 | Araki | 60/602 |
| 2007/0055437 | A1 | * | 3/2007 | Yamaguchi et al. | 701/104 |
| 2007/0100177 | A1 | * | 5/2007 | Clark et al. | 585/14 |
| 2008/0120013 | A1 | * | 5/2008 | Yamaguchi et al. | 701/103 |
| 2009/0216423 | A1 | * | 8/2009 | Forti et al. | 701/103 |
| 2009/0234559 | A1 | * | 9/2009 | Jung et al. | 701/103 |
| 2010/0005706 | A1 | * | 1/2010 | Burgazli et al. | 44/308 |

* cited by examiner

*Primary Examiner* — John Kwon
*Assistant Examiner* — Johnny Hoang
(74) *Attorney, Agent, or Firm* — Volpe and Koenig, P.C.

(57) ABSTRACT

A logical sensor method is provided for internal combustion engines (Compression Ignited or Spark Ignited) based on a software algorithm (SBS). This algorithm identifies the mixture diesel/bio-diesel present in a vehicle's fuel tank and adapts the engine control strategy as a function of the fraction of FAME (Fatty Acid Methyl Esters) vegetal-based oil or oil produced from organic waste blended into a crude oil based diesel fuel (average chemical formula $C_{12}H_{23}$).

12 Claims, 4 Drawing Sheets

SBS LOGICAL BIO-DIESEL SENSOR

FIELD OF INVENTION

The present disclosure refers to a logical sensor for Internal Combustion engines (Compression Ignited or Spark Ignited) named SBS (Software Biodiesel Sensor), which identifies a mixture diesel/bio-diesel present in a vehicle fuel tank, using software-based algorithms to identify the fraction of FAME (Fatty Acid Methyl Esters) vegetal-based oil or oil produced from organic waste blended into a crude oil based diesel fuel (average chemical formula $C_{12}H_{23}$) and thereafter adapts the engine control strategy as a function of this fraction.

BACKGROUND

In a diesel or Compression Ignition (CI) engine air, normally diluted by a small controlled fraction of residual gas, is compressed trough a volume ratio from approximately 12 to 20, and liquid fuel is sprayed into the cylinder during the compression stroke near the top dead center position of the piston (TDC).

Since both the pressure and temperature of the cylinder contents at the time of injection are very high, chemical reactions begin as soon as the first droplets of injected fuel enter the cylinder.

FIG. 1 shows the main parts by which the combustion process is accomplished in a modern CI-engine. The fuel is transferred from the tank (1) through an appropriate filter (2) to a high-pressure pump (3), which delivers the fuel at a pressure between 130 and 200 MPa to a rail (4) common for all the fuel injectors (6a to d). An Electronic Control Unit (ECU) (7), which gathers information of engine speed, temperature, fuel pressure (5) and load target, adapts the engine control parameters to optimize the number of injections and their duration to fulfill both load target and exhaust gas pollution requirements. The injector atomizers are designed to produce a spray pattern (8), which is adapted individually to the combustion chamber geometry (9).

However, in a CI-engine the chemical reactions start so slowly that the usual manifestations of combustion, such as a measurable pressure rise, occur only after the expiration of an appreciable period of time called the delay period. The sum of the injection and the delay periods characterizes the first phase of combustion. The delay period is followed by a pressure rise, which is conditioned by the fuel used, the total quantity of fuel injected with respect to the air trapped in the cylinder (Air-Fuel ratio A/F), the number of injections on which the total amount of fuel is distributed and the Crank Angle (CA) values at which the injections are performed. The pressure-rise period characterizes the second phase of combustion.

The third phase of combustion, called phase 3, starts after the maximum combustion pressure is reached. This blow-down phase will determine the nature and volume of the different post combustion products in the exhaust gas (NOx, Particulate matter, Aldehydes, etc.) and is equally heavily influenced by an appropriate multiple injection strategy.

FIG. 2 shows a typical generic pressure-CA diagram for a diesel engine in which only one single injection is performed in the period between 40° and 20° CA before Top Dead Center (TDC) of the compression stroke. The dashed line represents compression and expansion of air only, without combustion. The continuous line represents compression and expansion with combustion. The injection period is followed by the delay period and their sum equals the phase one.

The main combustion takes place during the pressure rise, called phase two, which terminates at the maximum combustion pressure. For a given fixed definition of the A/F-ratio, the injection strategy, the combustion chamber geometry and the fuel composition the CA-lengths of phase one and two as well as the Pmax-value (slope of pressure rise) are parameters that have a cycle-to-cycle variation of less than +/−3% at a given load point.

The phase three (Blow-down) will by the combustion chamber temperature distribution (absolute level and homogeneity) largely influence the production of eventually unwanted post-combustion products in the exhaust gas.

It is important to understand that the complete pressure-CA diagram together with the induced exhaust gas temperature represent a unilateral signature of both the complete chemical and thermodynamic combustion process (pressure-CA diagram) and the potential equilibrium of pollutant matter in the exhaust gas (Temperature) for a given set of fixed boundary conditions (engine speed, load, injection strategy, overall engine temperature, well-defined standard fuel composition).

The important characteristics of a commercial typical diesel fuel (average chemical formula $C_{12}H_{23}$) are the ignition quality, the density, the heat of combustion, the volatility (phase one and two as well as Pmax), the cleanliness and the non-corrosiveness. All but the two last properties are completely interrelated. This is why the combustion-quality for a commercial diesel fuel is rated by the Cetane number. As in the case of octane rating of gasoline, diesel fuels are rated with respect to combustion quality by a method that uses engine-test comparisons with reference fuels (e.g. American Society for Testing Materials (ASTM) Standard D613).

The primary reference fuels are normal cetane ($C_{16}H_{34}$), straight chain paraffin having excellent ignition quality, and alpha-methylnaphthalene ($C_{10}H_7CH_3$), a naphthenic compound having very poor ignition quality. A special engine with a compression-ignition cylinder is used as standard equipment for this type of test.

The percentage of cetane in a blend of the above indicated reference fuels giving the same ignition delay as the fuel under test is taken as the cetane number of the fuel in test. As the pressure-CA diagram is a unilateral signature of the combustion process the cetane number is a unilateral signature of the fuel combustion-quality.

The important consequence is that if all engine parameters are kept constant and a fuel with a different cetane number is used, the pressure-CA diagram signature will change as the phase one, two and the Pmax-value changes.

In recent years the presence of bio-fuel blends for SI-engines (mixing of pure gasoline and ethanol at various fractions—flex fuel) have become popular as a very efficient and practical means to decrease the amount of permanently stored $CO_2$ in the atmosphere.

It therefore was suggested to mix current diesel fuel with a fraction of FAME (Fatty Acid Methyl Esters) vegetal-based oil. The higher the percentage of FAME-oil the more important the decrease of the amount of permanently added $CO_2$ in the atmosphere. A mixture containing "x" % of FAME oil and (100-x) % of fossil oil will be referred to as a "Bx" mixture.

For current commercial diesel engines a FAME-oil fraction of less than 20% is acceptable without major changes in the common rail (CR) based injection strategy. Unfortunately at fractions between 20 and 100% the reaction of the combustion process becomes uncontrollable with combustion patterns, which gradually features extreme detonation conditions. An immediate consequence is an important increase in both specific fuel consumption and in exhaust gas pollutants and it can eventually lead to a total misfiring and in extreme cases to the destruction of the engine.

As a matter of fact the pure commercial diesel fuel has an average cetane number of approximately 42, whereas the cetane number of a 100% Fame-oil is typically around 60. The cetane number of a 20% FAME-oil fraction will be approximately 48 to 49, which explains why above this percentage the combustion becomes uncontrollable and action is necessary.

SUMMARY

The objective of the present invention is the design of a strategy for recognition of the biodiesel-fraction, Bx, of FAME-oil blended into the crude oil based diesel fuel and the proposal for a software-based sensing method to create an image of the temporal combustion behavior (pressure-CA), which uses sensors already in service for current CR-mixture preparation systems. Therefore the basic approach proposed by the invention requires no auxiliary sensor to be added and uses only sensors already present by a specific CR-engine application.

BRIEF DESCRIPTION OF THE DRAWINGS

The present invention will be better understood by the enhancement provided by the joined figures, which represent not-limitative examples.

DETAILED DESCRIPTION OF THE PREFERRED EMBODIMENTS

As previously stated, the CA-resolved pressure-CA diagram offers a unilateral signature of the complete chemical and thermodynamic combustion processes for a given set of fuel, mixture preparation system and engine load parameters.

In other words, if the engine load and mixture preparation system parameters are kept constant, a change as above indicated in the pressure-CA diagram (sum of injection duration and combustion delay, pressure rise/slope and Pmax-value, which hereafter are referred to as the 3 combustion key parameters) will be an expression for the fuel composition (cetane number) and consequently an indicator of the percentage of FAME-oil blended into the crude oil based diesel fuel.

The primary action to be performed according to the invention is to determine the fraction of bio-fuel blended into the normal diesel fuel and the invention proposes for this action a reverse engineering method to determine the 3 combustion key parameters based on the interpretation of the pressure-CA diagram or a representative image of this diagram.

Figure 1:
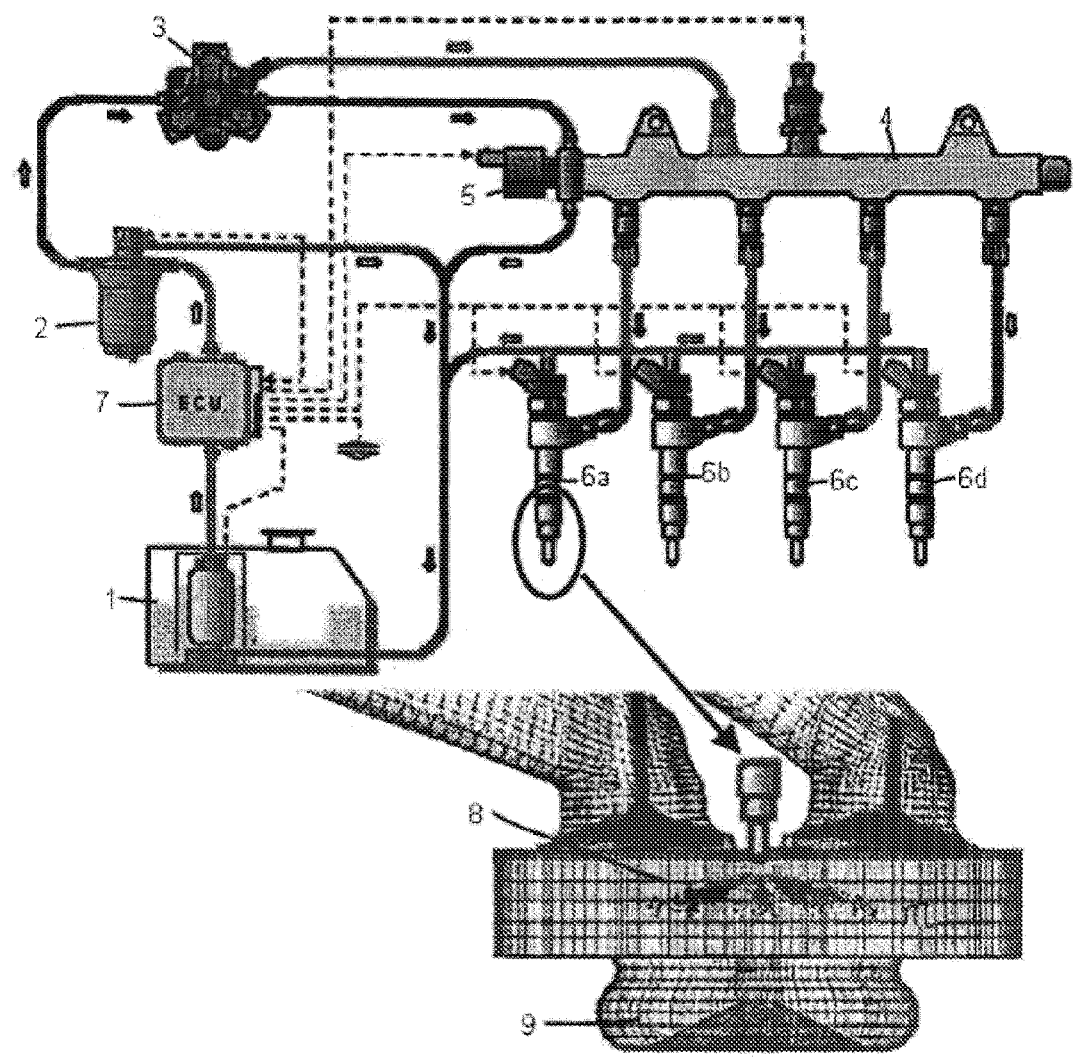
FIG. 1 is a graphical depiction, which shows the main parts by which the combustion process is accomplished in a modern CI-engine.
Figure 2:
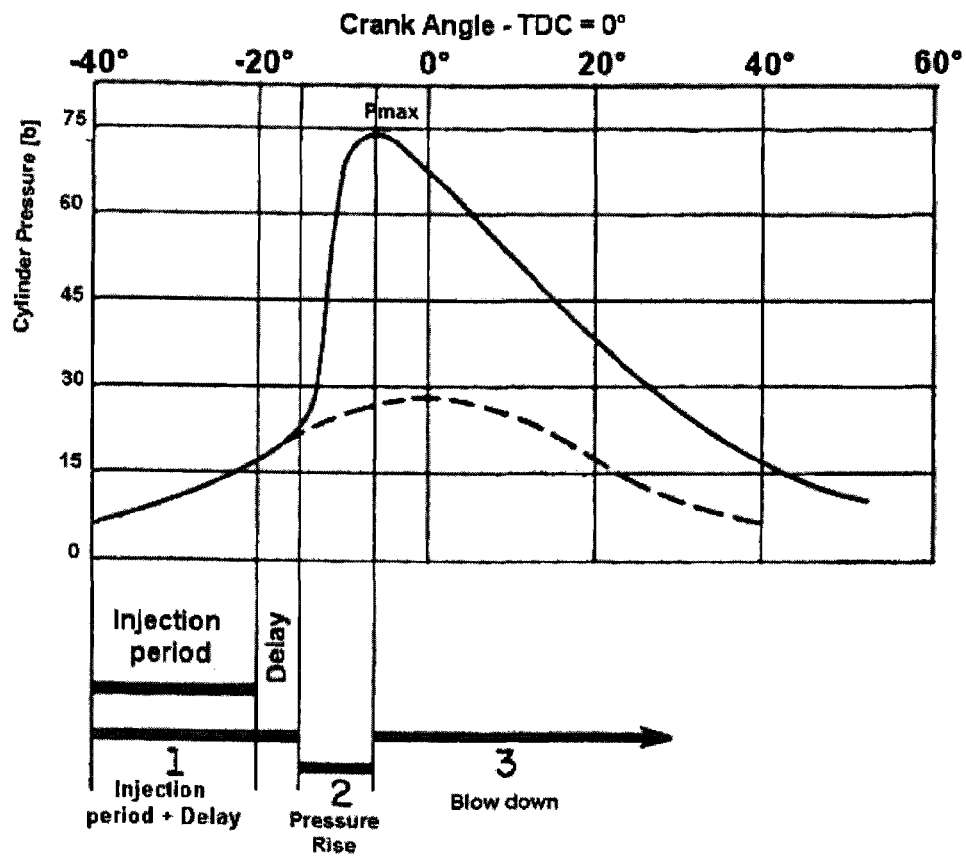
FIG. 2 is a graph, which shows a typical generic pressure-CA diagram.
Figure 3A:
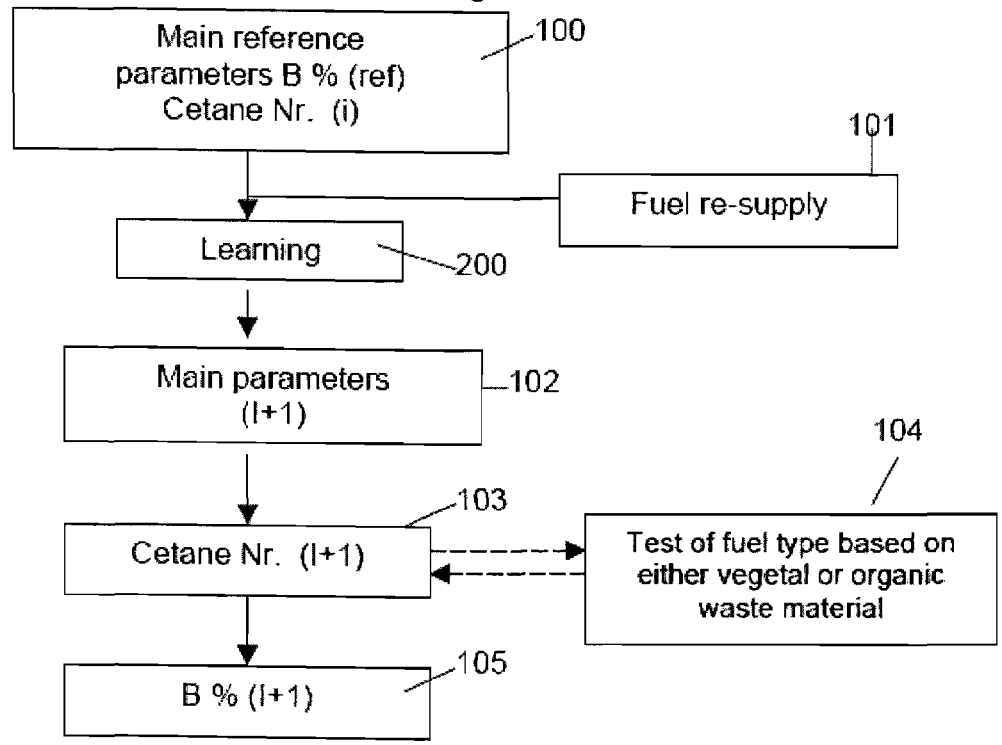
FIG. 3a is a block-diagram of logical data flow as used in the present invention.

This primary action is the fuel recognition phase (FIG. 3a). As this is already done by SI-flex fuel vehicles (Magneti Marelli Brazilian patent application numbers PI 020226-5, C1 0202226-5 and PI 0405357-5) the phase one starts with a learning process, which performs a systematic test after re-supply of fuel in the tank.

In this phase the ECU retrieves a reference value for the cetane number, which will correspond to a reference fuel composition. For the reference fuel is applied a corresponding set of engine control strategies, which are engine/vehicle specific and located in the ECU memory area where they were loaded during the initial development of the engine-specific calibration.

Furthermore the ECU will link the reference fuel composition to a specific reference configuration of the 3 combustion key parameters (reference key parameters), which are also engine/vehicle specific and located in the ECU memory area where they were loaded during the initial development of the engine specific calibration.

The engine combustion behavior will change by burning a fuel with a composition different from that of the reference fuel and hereby introduce a proportional change in the 3 combustion key parameters compared to the reference values.

Figure 3B:
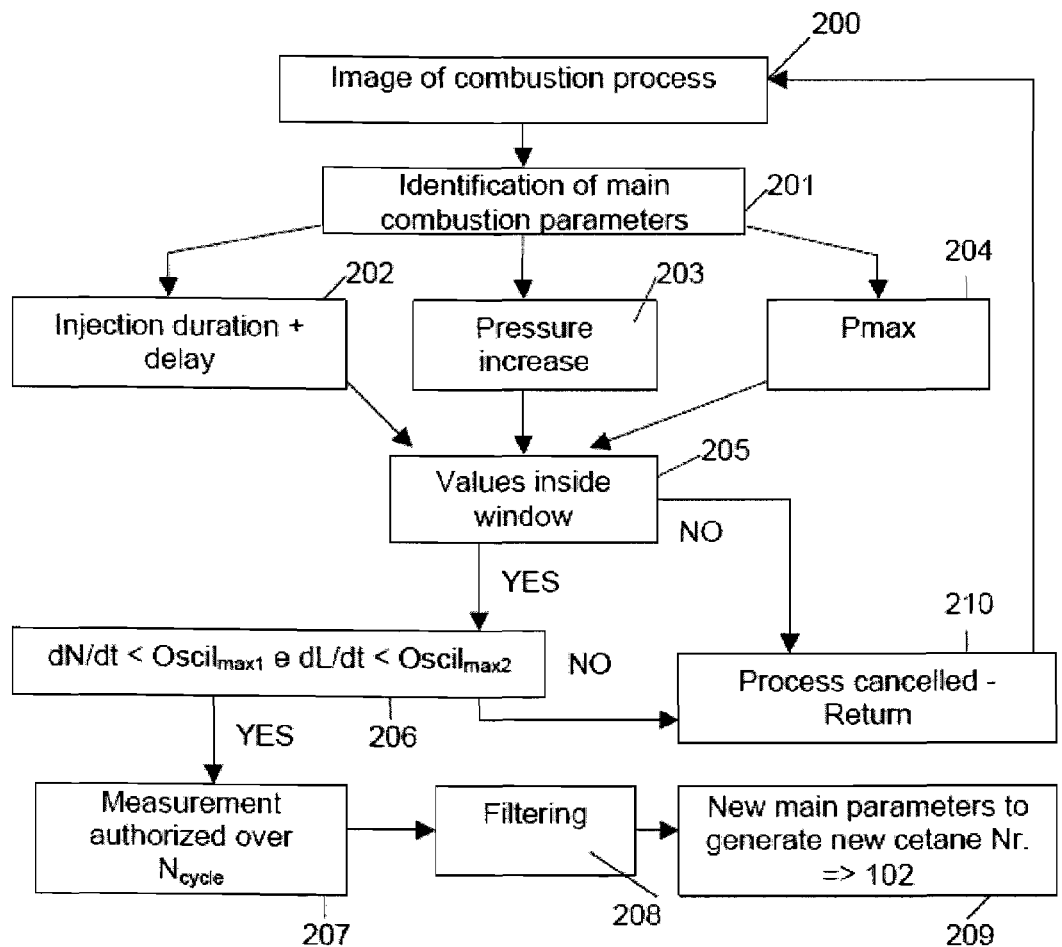
FIG. 3b is a block-diagram of logical data flow as used in the present invention.

The identification of the change in the 3 combustion key parameters is made according to the following scheme (FIG. 3b). Each of the 3 combustion key parameters (201) is listed in a two-dimensional look-up table (202, 203 and 204). The break-points are located on an engine-speed axis (x) and an engine load axis (y). The upper and lower values ($N_{min}$, $N_{max}$, $L_{min}$ and $L_{max}$) of engine speed and load define the spatial window (205) within which identification can take place. Reference key parameters exist in the same format and are as stated above engine/vehicle specific and located in the ECU memory area where they were loaded during the initial development of the engine specific calibration. In general a complete set of reference combustion key parameter maps exist for the hot engine handling ($T_{water}$>$Threshold_{water}$° C.) and another set for cold engine handling ($T_{water}$<$Threshold_{water}$° C.) but this is neither mandatory nor limitative.

A validation of a measurement of the instantaneous combustion key parameter status is only permitted if the following two conditions are fulfilled. The engine functional speed and load conditions must be within the defined spatial window (205) and the gradients of oscillation of the values (dN/dt and dL/dt) must be below predefined engine-specific levels ($OSCIL_{max1}$ and $OSCIL_{max2}$) (206). When the measurement is authorized it is extended over a predefined engine-specific number of engine cycles ($N_{cycle}$). The recorded values are then filtered (208) and an average value of each combustion key parameter validated (209).

The change in combustion key parameters with respect to the reference values is then translated into the corresponding evolution in the cetane number. This evolution is compared to an engine/vehicle specific functional mapping that was located in the ECU memory area during the initial development of the engine specific calibration.

By this means the change in the 3 combustion key parameters with respect to the reference values will be linked to a new (refreshed) cetane number value with respect to the original reference value (103).

A further enrichment of the invention is the possibility to detect the specific type of FAME vegetal-based oil or oil produce from organic waste used in the blend (e.g. Soya bean, Palm oil or other). This function requires the fulfillment of two specific conditions. When a vegetal-based oil different from the reference FAME oil is burned one or more of the 3 key combustion parameters will, for a given percentage Bx of vegetal-based oil, change with respect to the reference FAME oil condition. This means a change in the cetane number for Bx with respect to the reference FAME oil condition.

The first condition is therefore that each vegetal-based oil different from the reference FAME oil must be tested on the engine during the engine/vehicle specific initial calibration and the resulting maps of combustion key parameters and cetane numbers must be located in the ECU memory area during this initial development of the engine specific calibration.

The second condition is that the used ECU must offer a storage capacity, which is sufficient to allow the permanent presence of not only the maps related to the reference FAME oil, but also the parallel maps or multiplication tables for each supplementary vegetal-based oil formulation susceptible to be used within a specific area/country delimitation.

If the two conditions are satisfied a supplementary learning loop can be inserted before the validation of a new cetane number. FIG. 3a shows at which location this supplementary test is performed (104).

After the new cetane number (103) is known (FIG. 3a) the new percentage Bx of FAME-oil in the diesel fuel is known (105).

Figure 4:
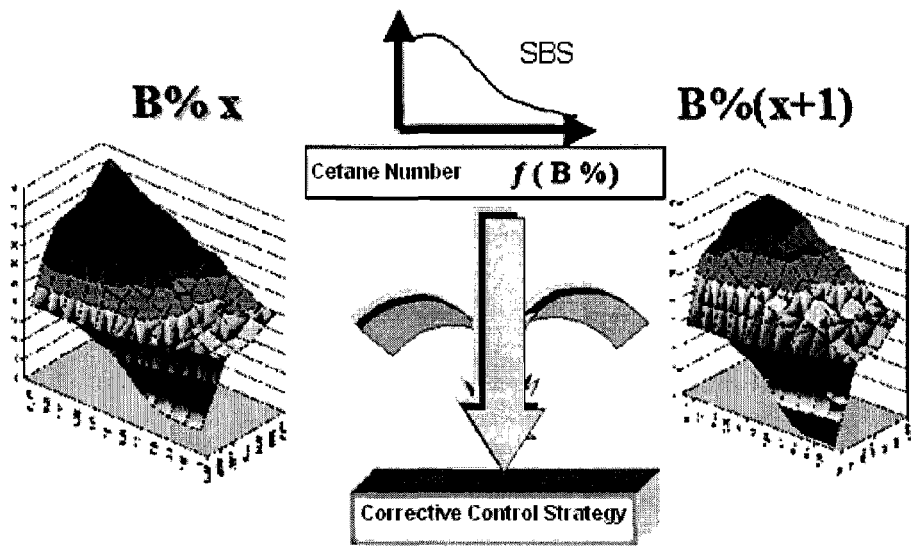
FIG. 4 is a 3-D representation of the engine control adaptation produced by an intelligent software sensor approach.

At this point, a secondary action (FIG. 4) is performed which is the engine control strategies adaptation. In this phase the control parameters, preferentially expressed in 3-D maps, are adapted according the interpolation between the nearest pre-mapped control strategies "x" and "x+1".

As the propagation of fuel from the tank to the engine is time dependant the stabilized fuel composition B $\%_{stabilized}$ is only reached after a certain predefined engine/vehicle-specific delay $T_{stabilization}$. The learning process, which starts immediately after re-fuelling, will therefore be continued at regular predefined engine-specific intervals until the total time for learning supersedes $T_{stabilization}$.

Both action one and two can be performed only when an engine cycle resolved information of the pressure-CA diagram could be detected by the ECU. To perform the detection several approaches are possible.

One approach, which is direct and has been tested on demonstrator vehicles powered by Spark Ignited (SI) engines designed to work both in SI-mode and Controlled Auto Ignition (CAI) mode, is to implement a fast pressure sensor in each cylinder.

However, the cylinder-individual pressure sensor is a component submitted to harsh environmental conditions (pressure, vibrations and temperature) and with a precision requirement of less than 5% error of full-scale extension. This means that such a device, even at large-scale production, remains a high cost component.

To overcome this problem, the present invention proposes a different sensing method, which creates an image of the combustion process based on the intelligent sensing of the instantaneous crankshaft acceleration (Brazilian Patent PI 9204450).

Figure 5:
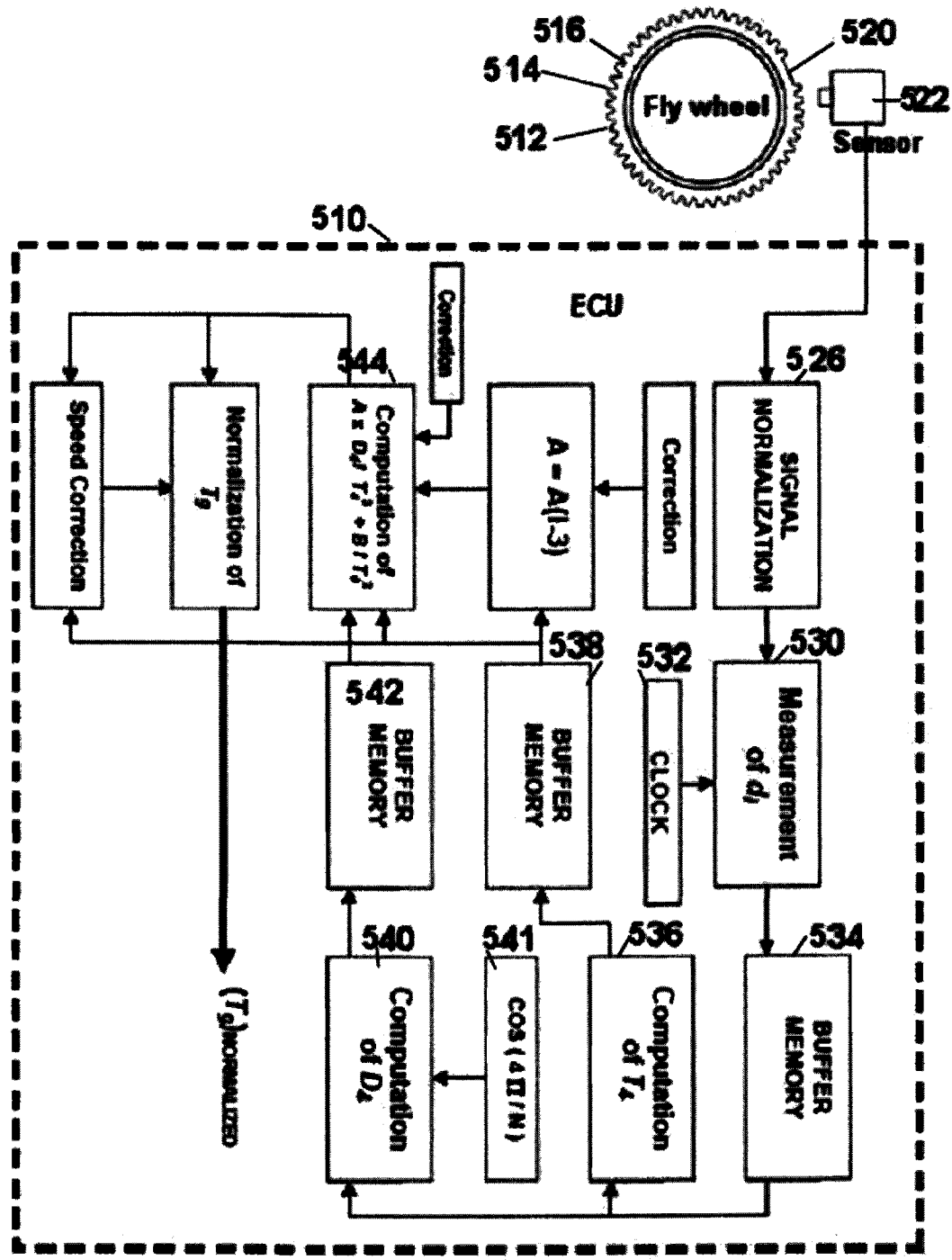
FIG. 5 is a block-diagram of data treatment within the perimeter of a logical torque sensor system.

FIG. 5 provides the necessary basic information to understand the functioning principle of this kind of software sensor, which provides information of the desired combustion parameters. The ECU 510 connected to a pulse sensor 522 (e.g. variable reluctance or "Hall"), which is positioned to measure the angular position and acceleration of a tooth-wheel 512 fixed at the engine crankshaft (e.g. on the flywheel). The angular profile of the tooth-wheel is divided in a number N (e.g. 60) of teeth 516 and holes 514 of equal length. In one point of the tooth-wheel 2 teeth 520 are transformed in holes and this area is positioned on the flywheel to identify the top dead center of a cylinder (e.g. cylinder number 1).

The duration $d_i$ of time required to measure a passage of a tooth is data-handled by the software algorithms based in blocks 526 (signal normalization), 530 (time measurement of $d_i$) 532 (comparative clock) and 534 (buffer memory).

From the buffered values of $d_i$ are extracted (block 536) by a real time Fourrier analysis on one combustion cycle (2 cycles per revolution for a 4 cylinder 4-stroke engine) an equivalent number of time fractions $T_4$ each representative of a small time-window of the combustion. These values are buffered in the block 538. In parallel, a second term $D_4$ is computed by block 540 assisted by block 541 and buffered in block 542. This term is the projection of the alternating component of the instantaneous angular velocity of the flywheel (crankshaft) on the rotating vector of combustion frequency.

Finally, block 544 combines the terms $T_4$ and $D_4$ with the engine dependant constants A and B. The cyclic torque variation can the generically be expressed by the expression:
$Tg = A \times D_4/T_4^3 + B/T_4^2$ The constants A and B must be calibrated for each engine application and the computed values of Tg corrected for high engine speed distortion.

The tooth wheel is referenced at one pair of cylinders (e.g. four cylinder engine) only, but a cylinder individual resolution can be obtained by a combination with a camshaft based phase sensor. The advantage of the use of this sensor for detection of the combustion parameters is that they are already implemented on the engine for the control of the CR-mixture preparation system. No supplementary sensor such as cylinder-individual combustion pressure sensors must be added.

In order to make an estimation of pollutants content in the exhaust gas the detection procedure suggested by the present invention can be combined with and added exhaust gas temperature sensor (low cost). A comparison between the instantaneous Tg values and the evolution over a certain number of cycles makes this possible as both particulate matter and $NO_x$ values are dependant on the cylinder gas temperature during the blow down phase.

What is claimed is:

1. A method for logical sensing of a cetane number of a mixture of crude oil fuel and bio fuel injected by at least one fuel injector into at least one combustion chamber of an internal combustion engine having at least one cylinder configured to burn the injected mixture and for controlling the engine by an electronic engine control unit (ECU) controlling said at least one fuel injector and changing an engine control strategy according to the sensed cetane number to optimize a combustion process, the method including the following logical sensing steps:

starting a learning process in which a reference value for the cetane number is retrieved from maps pre-registered in said ECU;

applying the engine control strategy including an injection phase, injection duration and cetane number controls which are specific to the engine;

extracting all main combustion parameters from a pressure diagram expressing a pressure in said at least one engine cylinder as a function of a crank angle;

comparing extracted values of said main combustion parameters to corresponding values pre-registered in said ECU;

identifying from said main combustion parameters a new corresponding cetane number; and further changing the engine control strategy within the ECU in adapting at least one of the injection phase, duration and cetane number controls to optimize the combustion process.

2. The method according to claim 1, wherein an implementation of said logical sensing steps in said electric engine control unit, separates said pressure diagram in parameters that identify durations of an ignition delay period (phase one), a pressure rise phase (phase two) and a crank angle position and value of a combustion peak pressure.

3. The method according to claim 2, further comprising a comparison of identified combustion parameters with engine-specific pre-calibrated maps pre-registered in the ECU, each map corresponding to a specific engine speed, load and fuel mixture situation, and a step of performing an N-order interpolation between maps pre-registered in said ECU and surrounding real-time recorded combustion parameters and computing a data-set proportional to a fraction of bio-fuel present in a crude oil based primary fuel defined by said cetane number.

4. The method according to claim 2, further comprising a step of identification of a specific type of vegetal-based oil present in the injected mixture.

5. The method according to claim 4, further comprising a step of detection of a specific type of vegetal-based oil by comparison of said identified main combustion parameters with engine-specific pre-calibrated maps, which are pre-registered in said ECU and representative of different types of oil and further making a correction corresponding to a measured cetane number (105).

6. The method according to claim 2, further comprising a step of applying, a pre-mapped corrective injection strategy, including injection timing, duration and number controls, according to computed combustion parameters, to optimize the combustion process.

7. The method according to claim 2, further comprising a step of using a sensing approach, which creates a representative image of the combustion process using a pulse sensor that is positioned to measure angular position and acceleration of a tooth-wheel directly connected to a crank shaft of said engine, and which, from this information, extracts an instantaneous corrected gas torque for each engine cylinder via software implemented computations.

8. The method according to claim 7, further comprising a step of comparing a signal from an added exhaust gas temperature sensor to the instantaneous pressure diagram values over a given number of engine cycles to estimate a trade off between produced amounts of particulate matter and $NO_x$ and using this information to make a correction of the used injection strategy.

9. The method according to claim 2, further comprising a comparison of identified combustion parameters with vehicle-specific pre-calibrated maps pre-registered in the ECU, each map corresponding to a specific engine speed, load and fuel mixture situation, and a step of performing an N-order interpolation between maps pre-registered in said ECU and surrounding real-time recorded combustion parameters and computing a data-set proportional to a fraction of bio-fuel present in a crude oil based primary fuel defined by said cetane number.

10. The method according to claim 2, further comprising a step of identification of a specific type of organic oil present in the injected mixture.

11. The method according to claim 10, further comprising a step of detection of a specific type of organic oil by comparison of said identified main combustion parameters with engine-specific pre-calibrated maps, which are pre-registered in said ECU and representative of different types of oil and further making a correction corresponding to a measured cetane number.

12. The method according to claim 7, further comprising a step of comparing a signal from an added exhaust gas temperature sensor to the instantaneous corrected gas torque values over a given number of engine cycles to estimate a trade off between produced amounts of particulate matter and $NO_x$ and using this information to make a correction of the used injection strategy.

* * * * *